United States Patent [19]

Ramotowski

[11] Patent Number: 5,256,355

[45] Date of Patent: Oct. 26, 1993

[54] METHOD FOR BONDING A POLYURETHANE MOLDING COMPOSITION TO A CABLE JACKET OF AN OLEFIN/ESTER INTERPOLYMER

[75] Inventor: Thomas S. Ramotowski, East Lyme, Conn.

[73] Assignee: The United States of America as represented by the Secretary of the Navy, Washington, D.C.

[21] Appl. No.: 948,561

[22] Filed: Sep. 23, 1992

[51] Int. Cl.$^5$ .............................................. B32B 31/12
[52] U.S. Cl. ...................................... 264/135; 264/265;
264/331.19; 427/302; 427/322; 427/400;
428/420; 428/424.4
[58] Field of Search ................... 264/36, 134, 135, 265,
264/331.19, 45.6, 46.4; 427/302, 322, 400;
428/420, 424.4

[56] References Cited

U.S. PATENT DOCUMENTS

| | | | |
|---|---|---|---|
| 3,616,191 | 10/1971 | Fuerholzer et al. | 156/244.23 |
| 3,639,567 | 2/1972 | Harvig | 264/331.19 |
| 3,971,884 | 7/1976 | Meeks et al. | 427/400 |
| 4,018,948 | 4/1977 | Saracsan et al. | 427/400 |
| 4,181,761 | 1/1980 | Ishimoto et al. | 428/420 |
| 4,416,749 | 11/1983 | Mahr et al. | 427/400 |

FOREIGN PATENT DOCUMENTS 54-125268  9/1979  Japan ................... 427/400

*Primary Examiner*—Jay H. Woo
*Assistant Examiner*—Robert B. Davis
*Attorney, Agent, or Firm*—Michael J. McGowan; Prithvi C. Lall; Michael F. Oglo

[57] ABSTRACT

A room temperature curing polyurethane composition is bonded to the surface of cables having jackets of an olefin/ester interpolymer to provide a water resistant seal thereabout by first exposing the surface of a length of cable to an alkali metal hydroxide solution to hydrolyze the functional ester groups and thereby substitute hydroxyl groups for the organic acid of the ester in the interpolymer at the surface of the jacket. A diisocyanate primer is applied to the treated surface and it interacts with the hydroxyl groups to produce pendant reactive groups. A room temperature curing urethane prepolymer composition is then molded about the primed surface at ambient temperatures and the unreacted hydroxyl groups along the urethane prepolymer chain react with the pendant reactive groups of the jacket to produce a firmly bonded overmolding on the jacket.

10 Claims, 3 Drawing Sheets

METHOD FOR BONDING A POLYURETHANE MOLDING COMPOSITION TO A CABLE JACKET OF AN OLEFIN/ESTER INTERPOLYMER

STATEMENT OF GOVERNMENT INTEREST

This invention described herein may be manufactured and used by or for the Government of the United States of America for governmental purposes without the payment of any royalties thereon or therefor.

BACKGROUND OF THE INVENTION

(1) Field of the Invention

The present invention relates to electrical cables and, more particularly, to a method for producing a polyurethane protective coating about cables of the type having olefin/ester interpolymer jackets.

(2) Statement of Prior Art

In recent years there has been an increasing utitilization in marine installations of cables which employ "low-smoke" cross-linked polyolefin formulations (XLPOLYO) to meet Military Specification MIL-C-24643, "General Specification for Cable and Cord, Electrical, Low-Smoke, for Shipboard Use," dated Sep. 28, 1984. This specification which prescribed limiting standards with regard to fire retardation characteristics and production of smoke under combustion was developed by the United States Navy to improve fire safety on Navy ships and submarines.

Most polymers produce copious amounts of toxic smoke when burned; "low-smoke" XLPOLYO, on the other hand, is designed not only to generate smaller quantities of less toxic smoke when burned, but also to be somewhat self-extinguishing. Widespread use of "low-smoke" XLPOLYO-jacketed cables would allow the Navy to avoid highly destructive fires in shipboard cableways similar to that suffered by the USS TATTNAL (DDG-19) in the early 1980's. Moreover, the use of XLPOLYO jacketed cables is likely to be expanded in civilian vessels for the same reasons.

However, frequently it is necessary to splice or repair such cables, and it is necessary or desirable thereafter to provide a protective overmolding about the area of the repair or splice which will be strong and hydrolytically stable. When such activities must be performed in the field, room temperature curing of polyurethanes has been desirable since it is difficult to apply heat or radiation to facilitate curing of other encapsulants in many of the installations in which the cables are found.

Unfortunately, room temperature curing polyurethane compositions conventionally employed for such applications, were found not to bond well to the new olefin/ester interpolymer jackets. This was unacceptable for field situations where electronic cables often are spliced, attached to specialized connectors, etc. Uses such as these have traditionally required a strong, water-tight polyurethane overmold to reinforce the tensile strength of the cable and to ensure its water-tight integrity. Due to the issuance of the earlier discussed military specification (i.e., MIL-C-24643), many types of commonly used shipboard-rated electronic cables are now only available with "low-smoke" XLPOLYO jackets. Thus, the need for a successful, dependable method for bonding room temperature-curing polyurethanes to such jacket materials is becoming more pressing.

Some efforts to provide a polyurethane coating on "low-smoke" XLPOLYO jackets involved the use of heat curing polyurethanes. However, this is not desirable in the field because of the inherent requirement to use elevated temperatures for a period of time. Such a procedure requires not only a source of heat but also that the molds in which the urethane molded about the cable jacket be heat resistant, e.g., metal, and thus, an inventory of molds which would be relatively expensive and time consuming to produce. In contrast, the room temperature curing polyurethanes utilize simple conventional wax of plastic molds.

Accordingly, it is an object of the present invention to provide a novel method for producing polyurethane about electrical cable jackets of an olefin/ester interpolymer.

It is also an object to provide such a method in which the urethane molding composition may be cured at room temperature in relatively low cost molds.

Another object is to provide such a method in which the polyurethane overmolding produces a strongly bonded, water-tight covering about the electrical cable, and is thus able to reinforce the tensile strength of the cable and ensure its water-tight integrity at splices and/or repairs which have resulted in removal or opening of the underlying olefin/ester interpolymer jacket.

SUMMARY OF THE INVENTION

It has now been found that the foregoing and related objects may be readily attained in a method for bonding a polyurethane molding composition to the surface of cables having jackets of an olefin/ester interpolymer to provide a water resistant thereabout. In this method, a length of cable having a jacket of an olefin interpolymer containing functional ester groups has the selected surface of the interpolymer jacket exposed to an alkali metal hydroxide solution to hydrolyze the ester groups and thereby substitute hydroxyl groups for the organic acid group of the ester in the interpolymer at the surface of the jacket.

A diisocyanate primer is then applied to the treated surface of the jacket and interacts with the substituted hydroxyl groups to produce pendant reactive groups. A room temperature curing urethane prepolymer composition is then molded about the primed surface at ambient temperatures. The urethane prepolymer has unreacted hydroxyl groups along the prepolymer chain while react with the pendant reactive groups to produce a firmly bonded polyurethane overmolding on the jacket.

Preferably, the length of cable is immersed in the alkali metal hydroxide solution for a period of at least 15 minutes, and the solution is at least 1.0 molar in concentration. After reaction with the hydroxide solution, the cable jacket is rinsed with water and dried.

Desirably, the diisocyanate primer applied to the jacket is allowed to dry to remove all solvents before interaction with the urethane prepolymer composition. The urethane prepolymer composition is allowed to cure at ambient temperatures for at least 24 hours before use of the cable. Generally, the primed cable jacket is placed in a mold into which the urethane prepolymer is introduced about the jacket. Usually, treated portions of two cable lengths are placed in the mold to produce an overmolding about abutting ends of the two lengths.

Preferably, the interpolymer is an ethylene/vinyl acetate copolymer and the ester component comprises at least 15 percent by weight of the olefin/ester interpolymer.

DESCRIPTION OF THE PREFERRED EMBODIMENT

Figure 1:
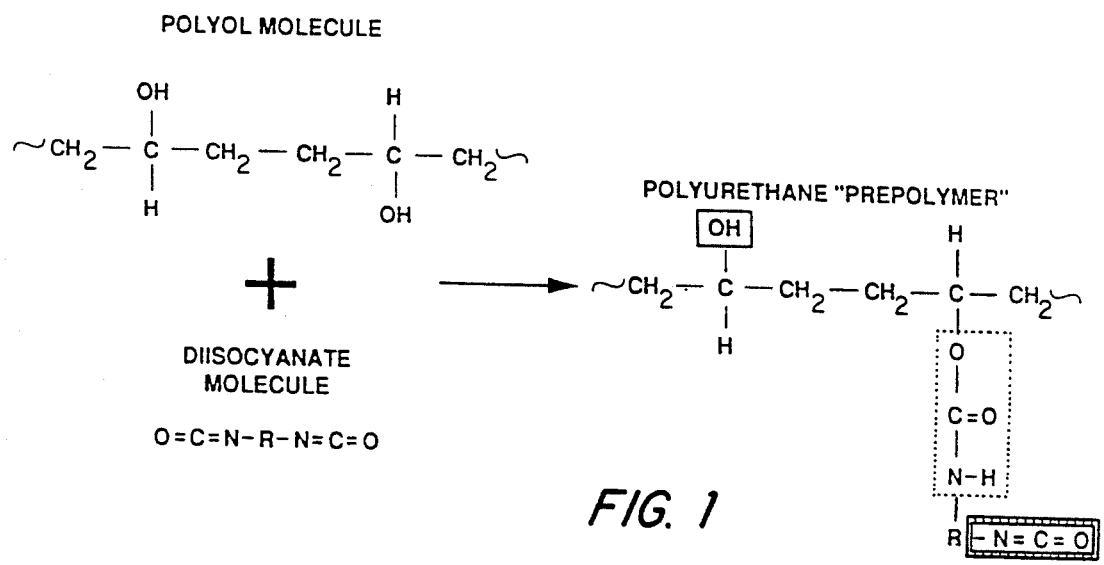
FIG. 1 illustrates the urethane polymerization reaction.

As indicated above, the present invention is directed to producing a polyurethane overmolding upon electrical cables of the type having a jacket of an olefin/ester interpolymer. As previously indicated, such jacket compositions have now been widely adopted for marine applications because of their low smoke characteristics because electrical and other fires in closed space frequently generate substantial smoke and toxic conditions for personnel in the immediate areas.

A survey of some of the cables which met the military specification MIL-C-24643 indicated that they were ethylene/vinyl acetate interpolymers containing substantial amounts (15 percent or more) of acetate groups along the polymer chain to provide the desired characteristics for the interpolymer. Unfortunately, a number of the jacket manufacturers were disinclined to provide specific information concerning chemical composition or resin supplier. However, analyses conducted on a number of compositions of cables meeting this specification indicated them to be ethylene/vinyl acetate interpolymers with or without other modifiers. Generally, it appears that these interpolymers contain 15%-30% by weight, and possibly more, of the vinyl acetate in the interpolymer chain. One cable manufacturer specifically identified a ethylene/vinyl acetate (EVA) copolymer made by Union Carbide Corporation with the designation HFDA-1393 (Black) as the composition utilized in the jackets which it was producing, and it was understood that several other cable manufacturers were also using this same composition.

Cable suppliers also indicated that the EVA polymers might contain inorganic hydrates such as aluminum oxide trihydrate in order to meet the fire retardancy requirements. Other modifiers may be present including other fire retardants and stabilizers.

For purposes of the present application, the olefin polymer (XLPOLYO) is identified as an olefin/ester interpolymer, and preferably ethylene/vinyl acetate (EVA).

For purposes of field identification of the nature of the polymer in the jacket, the existing solvent wipe and burning tests which had been used with prior jacket materials could not be employed. In evaluating various properties of the XLPOLYO formulations, it was found that the polymers routinely were quite dense when compared to other polymers also used for cable jackets. Accordingly, an identification field test was developed which involves placing a small specimen of the jacket polymer in a liquid of a density which will allow other polymers to float, ideally about 1.41-1.43 grams per cc. For convenience, 1,1,2-trichloroethane has been selected since it has a density of 1.4397 and is commonly available although potentially carcinogenic. Conveniently, the field test involves use of tweezers to drop a small sample of the jacket polymer into a small bottle containing 1,1,2-tricloroethane and observing whether it floats. If it sinks, this indicates that it is a dense polymer and most likely "low-smoke" XLFOLYO.

As can be readily appreciated, the substantial olefin content of such interpolymers provides a high degree of inertness and resistance to further reaction with other polymers. As previously indicated, application of a typical room curing polyurethane composition to the surface of such olefin/ester interpolymer jackets proved relatively unsuccessful in terms of bond strength to the underlying interpolymer of the jacket.

In studying the nature of the EVA polymer, it was recognized that the ester group presented a potential site for interaction. The urethane prepolymer compositions typically contain a diisocyanate and a polyol which react to produce polyurethane molecules which have an isocyanate group at one end of the molecule and a hydroxyl group at the other end. Although the isocyanate groups are extremely reactive-with other functional groups containing an active hydrogen (such as hydroxyl, mercaptyl, or amine groups), the ester group does not represent a candidate for a good bonding reaction, and this was evidenced by the failure to achieve good bond strengths when conventional - polyurethanes were molded about the olefin/ester interpolymer - jackets without the use of special cable priming procedures. The hydroxyl groups are normally not as reactive as the isocyanate groups although they can under certain circumstances be induced to form strong chemical bonds to other functional groups, unfortunately not including the ester groups which are found along the EVA chain.

Accordingly, the present invention involves an initial treatment of the jacket to replace the ester groups with hydroxyl groups and thereby introduce active hydrogen into the backbone of the ethylene/vinyl acetate interpolymer. Such saponification reactions are well known and conveniently employ alkali metal hydroxides in aqueous solution. However, when a polyurethane composition was molded against a saponified polymer jacket, the peel strength of the bond was found to be undesirably low, with such poor adhesion due to a lack of reaction between the urethane polymer and the underlying interpolymer of the jacket.

Accordingly, the present invention thereafter reacts diisocyanate primer with the saponified surface before the urethane prepolymer composition is molded thereabout. It was found that this series of steps produced significantly greater and acceptable peel strengths, presumably as the result of the creation of a chemical bridge between the ethylene/vinyl acetate backbone and the polymerizing urethane composition. Assuming that the saponification step converts the acetate groups into hydroxyl groups, the diisocyanate molecule would bond to the XLPOLYO by reacting with the newly formed hydroxyl group. This would leave very reactive isocyanate groups "dangling" from the XLPOLYO molecules. These groups could then react with, and bond to, the hydroxyl groups on the polyurethane prepolymer, thereby producing a strong chemical bond between the XLPOLYO and the polyurethane. See FIG. 1.

Figure 2:
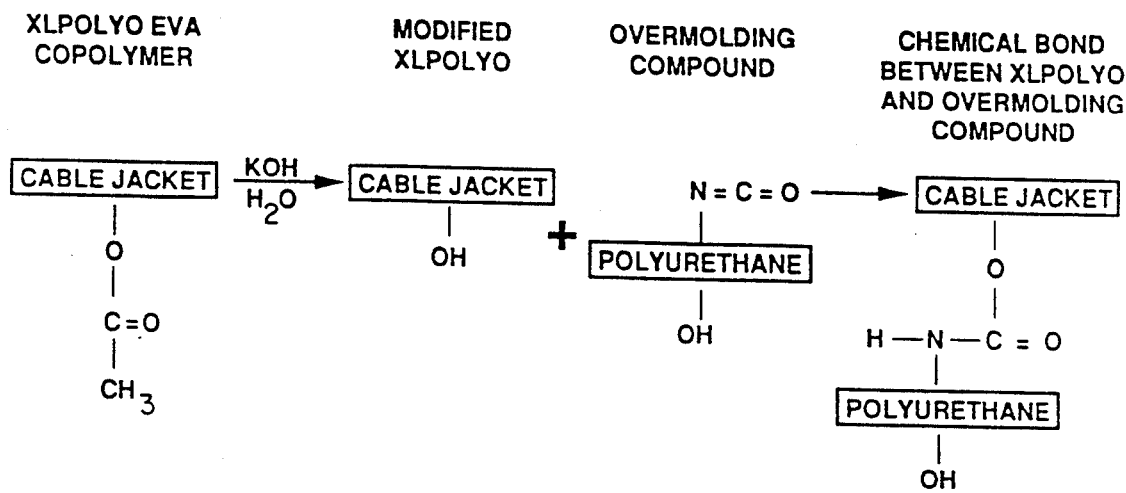
FIG. 2 is a schematic illustration of the several steps and reactions taking place in the process of the present invention.

The steps and apparent chemical reactions are schematically set forth in FIG. 2 of the drawings.

As a result, the process of the present invention involves the following steps:

1. Cleaning the cable jacket to remove grease, dirt, etc., with rags soaked in acetone, tetrahydrofuran or methylethyl ketone.

Figure 3:
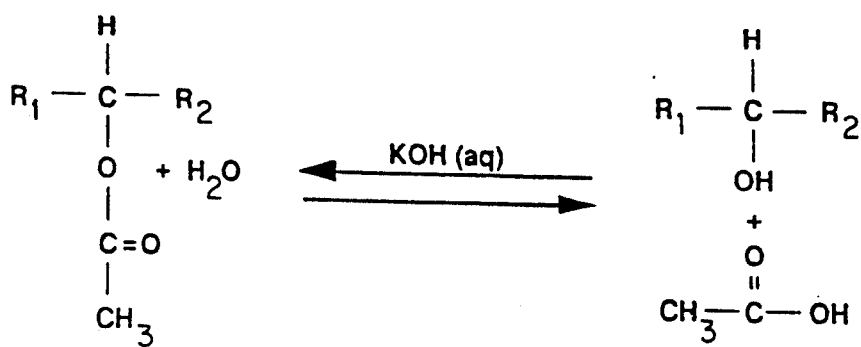
FIG. 3 illustrates the saponification reaction.
Figure 3:
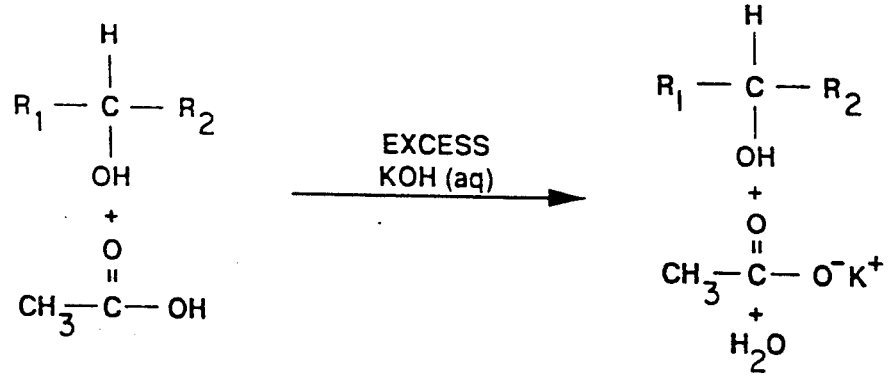

2. Treating the surface of the olefin/ester interpolymer jacket with an aqueous solution of an alkali metal hydroxide to convert the ester groups at the into hydroxyl groups, as schematically set forth in FIG. 3.

3. Rinsing the treated surface with water and then drying it.

4. Applying a diisocyanate primer to the surface of the treated jacket to react the primer with the hydroxyl groups and produce pendant isocyanate groups.

5. Drying the primed surface.

6. Molding a room temperature curing urethane prepolymer composition about the primed jacket to effect a chemical bond between the isocyanate groups of the jacket and the hydroxyl groups of the polyurethane prepolymer.

The aqueous solution of alkali metal hydroxide employed for the initial treatment of the cable jacket may vary in concentration from as little as 0.1 molar to as much a 3.0 molar and even more. There must be sufficient hydroxide in the solution to provide an excess of hydroxide ion to drive the reaction to effect substitution of the ester groups with the hydroxyl group. Preferably, the concentration is 1.0–2.0 molar, and either potassium or sodium hydroxide may be employed. The time for this reaction should be at least 15 minutes, and may range as long as four hours. Even greater periods may be employed, but without any significant additional benefit. Typically, a time period of 1–2 hours is employed with a 1.0–2.0 molar solution of sodium hydroxide.

After the saponification reaction has been completed, the surface of the jacket should be rinsed with water and allowed to dry. Although deionized or distilled water is preferred, tap water may also be employed.

Thereafter, the surface of the jacket is primed with a diisocyanate primer applied in sufficient thickness to ensure a complete coating. If the diisocyanate primer has a distinctive coloration which is different from that of the underlying jacket, (typically a black color), the jacket should be overcoated until a uniform coloration change may readily be observed. Otherwise care should be taken to ensure that there is complete wetting and coating of the area being treated.

Selection of a suitable primer composition may involve some testing because at least one composition listed produced an "oily" surface which did not react well with the polyurethane, possibly as a result of a residual solvent with low volatility.

After the primer has been applied, it should be allowed to dry sufficiently to drive off the solvent in the primer. Since it may not be desirable or practical to use heat to expedite the drying, at least one hour should be allowed, but the time period should not exceed a 24 hour period since the isocyanate at the surface may become deactivated with the passage of time. The preferred drying time is in the range of 1–6 hours.

After the primed surface has dried, the cable is placed in suitable mold configured to provide the desired thickness and shape for the overmolding. The urethane prepolymer composition is then introduced into the mold about the cable jacket and the composition is allowed to cure in the mold about the treated cable. Generally, the room temperature curing compositions require a minimum of 12 hours to obtain a satisfactory degree of curing to effect a good bond and the desired water resistance. Preferably, the curing time will be at least 24 hours, but time periods in excess of 72 hours provide little, if any, additional benefit.

Illustrative of the efficacy of the present invention is the following specific example.

A sheet of ethylene/vinyl acetate copolymer of a formulation produced by Union Carbide under the designation HFDA-1393 (Black) was utilized to provide the test specimens for the jacket polymer in combination with a room temperature curing polyurethane composition made by Hexcel Corporation under the designation Uralite 3140.

The surface of the EVA sheet was wiped clean with methylethyl ketone and then immersed in potassium hydroxide solutions of different concentrations for thirty minutes following which the sheets were rinsed with distilled water and dried.

Following drying, the sheets were coated with a diisocyanate primer manufactured by Products Research and Chemical Corporation of Glendale, California 91209, under the designation PR-420. The coated sheets were then allowed to dry for a period of two hours at ambient temperature. The primed sheets were then placed in a mold and the polyurethane prepolymer composition was introduced into the mold and allowed to cure therein at room temperature for a period of twenty-four hours.

Following curing, the specimens so produced were subjected to a 180° peel test described in ASTM D-903 using one inch test strips on a Model 4206 Instron machine. The results are set forth below.

TABLE ONE

| Concentration of Hydroxide Solution | Average Peel Strenth (Pounds Per Linear Inch) |
| --- | --- |
| 0.1M KOH | 22.21 ± 1.79 |
| 1.0M KOH | 29.04 ± 0.44 |
| 3.0M KOH | 27.13 ± 0.89 |
| 6.0M KOH | 28.05 ± 0.69 |

Accordingly, it can be seen that the process of the present invention provides a firmly bonded polyurethane overmolding at room temperature for olefin/ester interpolymers of the type used in jacketed cables. This overmolded polyurethane not only bonds strongly to the underlying jacket but also provides a highly water-resistant coating. The polyurethane overmoldings for "low smoke" XLPOLYO jackets can be produced at room temperature in easily fabricated and inexpensive molds.

What is claimed is:

1. In a method for bonding a polyurethane molding composition to the surface of cables having jackets of an olefin/ester interpolymer to provide a water resistant seal thereabout, the steps comprising:
    (a) providing a length of cable having a jacket of an olefin interpolymer containing functional ester groups;
    (b) interacting the surface of the interpolymer jacket with an alkali metal hydroxide solution to hydrolyze the ester groups and thereby substitute hydroxyl groups for the organic acid groups of the ester in the interpolymer at the surface of said jacket;
    (c) applying a diisocyanate primer to said surface of said jacket, said primer interacting with said substituted hydroxyl groups to produce pendant reactive groups; and
    (d) applying about said primed surface at ambient temperatures a room temperature curing urethane prepolymer composition, said urethane prepolymer having unreacted hydroxyl groups along the prepolymer chain, said prepolymer composition reacting with said pendant reactive groups to produce a firmly bonded polyurethane overmolding on said jacket.

2. The method for bonding a polyurethane molding composition to cables having an olefin/ester interpolymer jacket according to claim 1 wherein said length of cable is immersed in said alkali metal hydroxide solution for a period of at least 15 minutes.

3. The method for bonding a polyurethane molding composition to cables having an olefin/ester interpolymer jacket according to claim 1 wherein said alkali metal hydroxide solution is at least 1.0 molar in concentration.

4. The method for bonding a polyurethane molding composition to cables having a olefin/ester interpolymer jacket according to claim 1 wherein said cable jacket is rinsed and dried after reaction with said alkali metal hydroxide solution.

5. The method for bonding a polyurethane molding composition to cables having an olefin/ester interpolymer jacket according to claim 1 wherein said diisocyanate primer applied to said jacket is allowed to dry for a period of time to remove any residual solvents before interaction with said urethane prepolymer composition.

6. The method for bonding a polyurethane molding composition to cables having an olefin/ester interpolymer jacket according to claim 1 wherein said urethane prepolymer composition is allowed to cure at ambient temperature for at least 24 hours before use of said cable.

7. The method for bonding a polyurethane molding composition to cables having an olefin/ester interpolymer jacket according to claim 6 wherein said primed cable jacket is placed in a mold into which said urethane prepolymer is introduced about said jacket.

8. The method for bonding a polyurethane molding composition to cables having an olefin/ester interpolymer jacket according to claim 7 wherein portions of two cable lengths are treated and are placed in said mold to produce an overmolding about abutting ends of said portions of said two lengths.

9. The method for bonding a polyurethane molding composition to cables having an olefin/ester interpolymer jacket according to claim 1 wherein said interpolymer is an ethylene/vinyl acetate copolymer.

10. The method for bonding a polyurethane molding composition to cables having an olefin/ester interpolymer jacket according to claim 9 wherein said ester component comprises at least 15 percent by weight of said olefin/ester interpolymer.

* * * * *